United States Patent
Flickinger et al.

(10) Patent No.: US 9,956,065 B2
(45) Date of Patent: May 1, 2018

(54) SYSTEM AND METHOD FOR TREATING AN INJURED CLAW OF AN ANIMAL

(71) Applicants: Tom Earl Flickinger, Washington, PA (US); Michael John Lisk, Carnegie, PA (US)

(72) Inventors: Tom Earl Flickinger, Washington, PA (US); Michael John Lisk, Carnegie, PA (US)

( * ) Notice: Subject to any disclaimer, the term of this patent is extended or adjusted under 35 U.S.C. 154(b) by 522 days.

(21) Appl. No.: 14/644,188

(22) Filed: Mar. 10, 2015

(65) Prior Publication Data
US 2015/0257864 A1    Sep. 17, 2015

Related U.S. Application Data

(60) Provisional application No. 61/952,367, filed on Mar. 13, 2014.

(51) Int. Cl.
*A61D 7/00* (2006.01)
*A01K 13/00* (2006.01)
*A61D 9/00* (2006.01)

(52) U.S. Cl.
CPC .............. *A61D 7/00* (2013.01); *A01K 13/007* (2013.01); *A61D 9/00* (2013.01)

(58) Field of Classification Search
CPC . A61D 7/00; A61D 9/00; A61D 1/005; A01K 13/007
See application file for complete search history.

(56) References Cited

U.S. PATENT DOCUMENTS

| | | | |
|---|---|---|---|
| 4,747,842 A * | 5/1988 | Dietz | A61D 7/00 604/309 |
| 5,676,643 A | 10/1997 | Cann et al. | |
| 7,703,419 B1 * | 4/2010 | Wexler | A01K 13/00 119/851 |
| 7,874,269 B2 | 1/2011 | Dunn et al. | |
| 9,833,094 B2 * | 12/2017 | Ricker | A01K 13/007 |
| 2005/0229862 A1 | 10/2005 | Dirle et al. | |
| 2013/0330416 A1 | 12/2013 | Greenwald | |

OTHER PUBLICATIONS

Merriam-Webster definition of "plug", merriam-webster.com/dictionary/plug.*

* cited by examiner

*Primary Examiner* — Adam Marcetich
*Assistant Examiner* — Jessica Arble
(74) *Attorney, Agent, or Firm* — LaMorte & Associates P.C.

(57) ABSTRACT

A system and method of treating and protecting an injured claw of an animal. A claw cap is provided. The claw cap is an elastomeric cap that defines an interior compartment. A medicated compound may be provided within the interior compartment of the claw cap. The injured claw is advanced into the claw cap through the open end of the claw cap. The injured claw is exposed to the medicated compound within the interior compartment of the claw cap. The claw cap then engages the exterior of the injured claw with a friction fit. The claw cap remains on the injured claw as the animal resumes normal activities. The claw cap is removed once the medication has affected a significant degree of healing.

14 Claims, 7 Drawing Sheets

SYSTEM AND METHOD FOR TREATING AN INJURED CLAW OF AN ANIMAL

RELATED APPLICATIONS

This application claims priority of Provisional Patent Application No. 61/952,367, filed Mar. 13, 2014.

BACKGROUND OF THE INVENTION

1. Field of the Invention

In general, the present invention relates to systems and methods that are used to stop bleeding from a cut or broken claw of an animal. More particularly, the present invention relates to applicator systems that are used to apply a coagulant to the cut or broken claw of an animal.

2. Prior Art Description

Many animals, especially pets, have their claws trimmed from time to time. In many animals, the claws contain nerve endings and blood vessels near the central base of the claw. When trimming an animal's claw, care is taken not to cut the portion of the claw that contains the nerve endings and blood vessels. In this manner, the claw is trimmed without causing any pain or bleeding in the animal. Unfortunately, the position of nerve endings and blood vessels varies between species, between breeds and from animal to animal in the same breed. As such, even an experienced person will sometimes cut a claw too short and accidentally cause bleeding and pain in the animal. Furthermore, animals often break their claws by scratching hard objects and/or fighting with other animals. A claw that is broken by trauma often exposes the blood vessels and nerves within the claw.

It will therefore be understood that a bleeding claw is a common ailment for many animals, especially domestic pets, such as dogs and cats. When a claw of an animal is bleeding, the claw is often treated with a coagulant agent, such as styptic powder. This causes the blood to clot at the wound site and stop the flow of blood. In the prior art, there have been many products developed that are intended to help a person apply a coagulant to the cut claw of an animal. Such prior art devices are exemplified by U.S. Pat. No. 4,747,842 to Dietz; U.S. Pat. No. 5,676,643 to Cann; U.S. Pat. No. 7,874,269 to Dunn; U.S. Patent Application Publication No. 2005/0229862 to Dirle; and U.S. Patent Application No. 2013/0330416 to Greenwald.

A problem shared by prior art systems is that they only apply the coagulant to the claw until the bleeding stops. The coagulant is typically administered using a fingertip, cotton ball or the like. The administration is done as quickly as possible, since it often requires paw of the pet to be restrained. Once the bleeding stops, the animal is left to heal on its own with whatever residual coagulant us retained at the wound site. However, pets, like dogs, do not have retractable claws. As such, the dog must walk on its broken claw. This often causes the claw to again begin to bleed, especially if the dog walks through water or wet grass. Furthermore, animals instinctively lick their wounds. As such, a pet can easily cause a cut claw to bleed by licking the claw. Once the claw begins to again bleed, the pet can drip blood onto the carpets and furniture of a house.

A need therefore exists for a system and method of applying a coagulant to a bleeding claw immediately after a cut and protecting the cut from reopening for an extended period after the cut. In this manner, the cut will not be inadvertently reopened before it has had a chance to heal. This need is met by the present invention as described and claimed below.

SUMMARY OF THE INVENTION

The present invention is a system and method of treating and protecting an injured claw of an animal. A claw cap is provided. The claw cap is an elastomeric cap that defines an interior compartment. The claw cap has an open end that provides access to the interior compartment.

A medicated compound is provided that is useful when applied to an injured claw. The medicated compound is disposed within the interior compartment of the claw cap or is positioned to fall into the claw cap as the injured claw enters the interior chamber of the claw cap.

The injured claw is advanced into the claw cap through the open end of the claw cap. The injured claw is exposed to the medicated compound within the interior compartment of the claw cap. The claw cap then engages the exterior of the injured claw with a friction fit. The claw cap remains on the injured claw as the animal resumes normal activities. The claw cap is removed once the medication has affected a significant degree of healing.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be embodied in many ways, only a few exemplary embodiments of the present invention system are illustrated. These embodiments are selected in order to set forth some of the best modes contemplated for the invention. The illustrated embodiments, however, are merely exemplary and should not be considered limitations when interpreting the scope of the appended claims.

Figure 1:
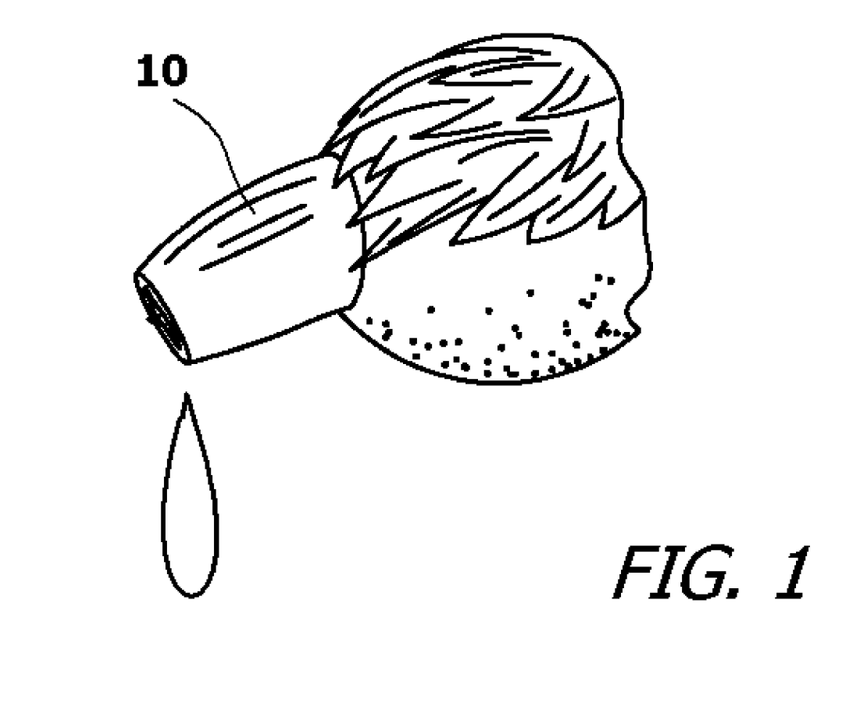
FIG. 1 is a perspective view of an injured claw of an animal.

Referring to FIG. 1, an injured claw 10 is shown that is bleeding. The injured claw 10 can be the result of either accident or over-cutting. The injured claw can be on any animal that has claws. However, in most anticipated applications, the claw will belong to a pet dog or cat.

Figure 2:
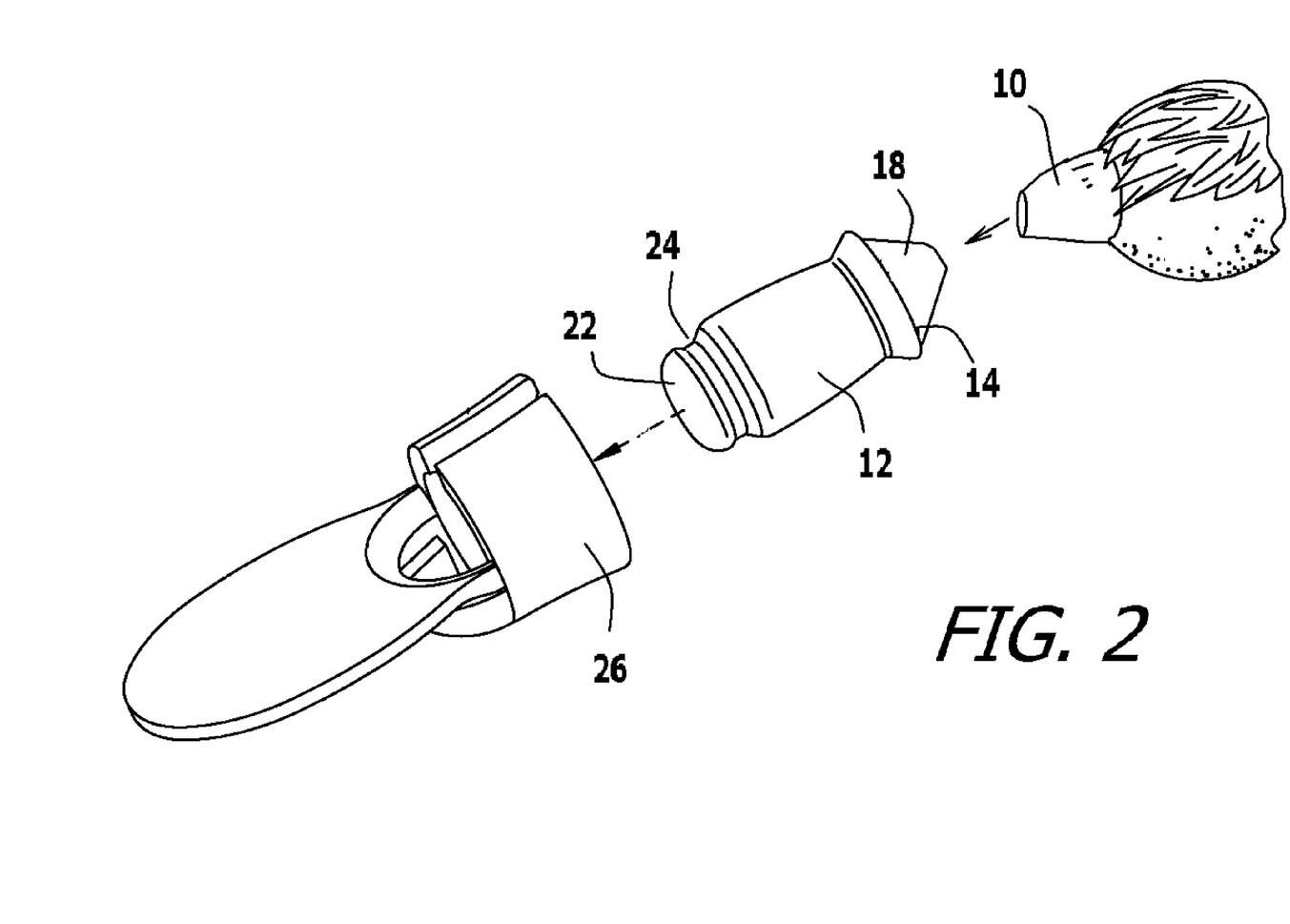
FIG. 2 is an exploded perspective view of an exemplary embodiment of the present invention system shown in conjunction with the injured claw of FIG. 1.
Figure 3:
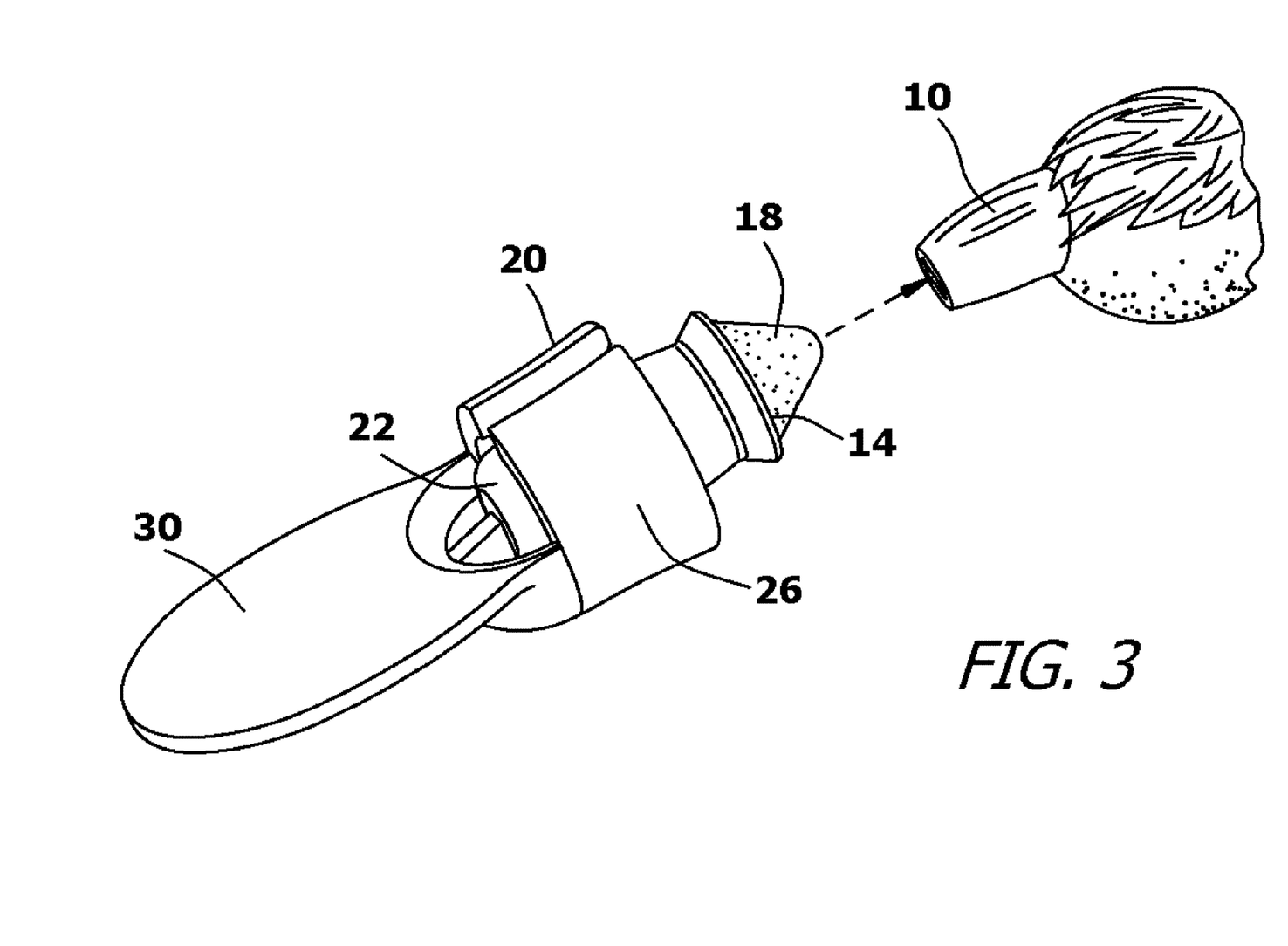
FIG. 3 is a perspective view of the exemplary embodiment of the present invention system shown with the claw cap engaged with the applicator.
Figure 4:
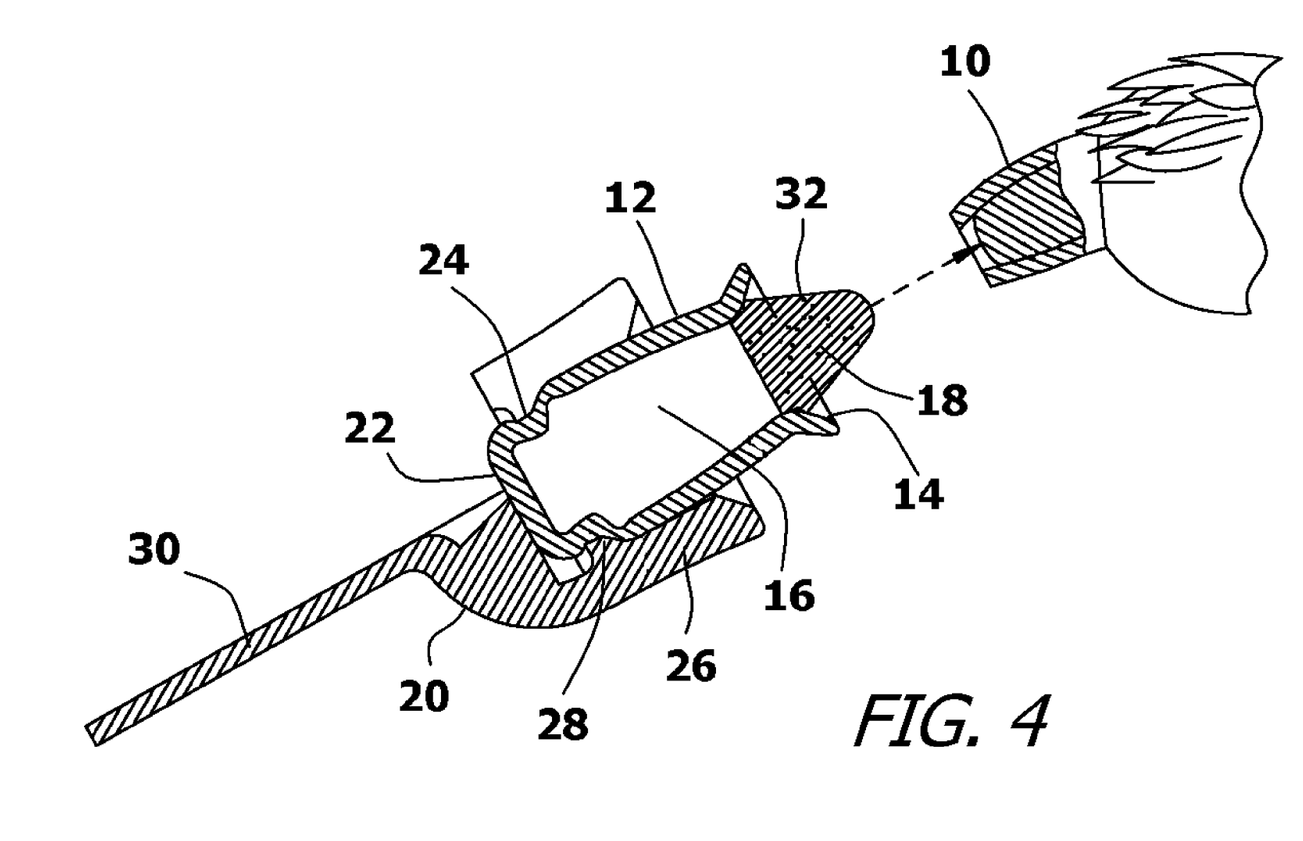
FIG. 4 is a cross-sectional view of the embodiment of the present invention system shown in FIG. 3.
Figure 5:
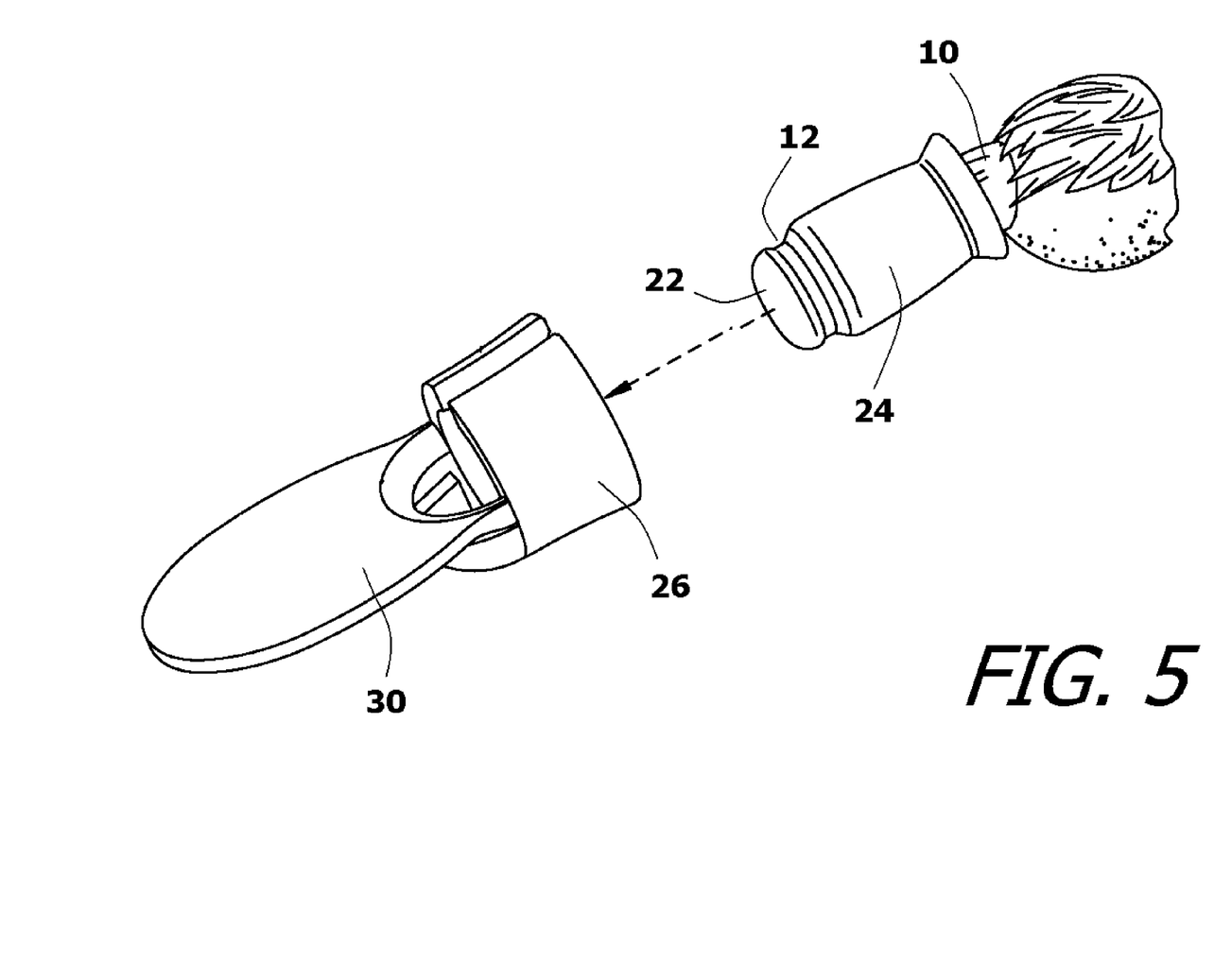
FIG. 5 is a perspective view of the exemplary embodiment of the present invention system shown with the claw cap engaged with the injured claw and separated from the applicator.

Referring to FIG. 2 in conjunction with FIG. 3, FIG. 4 and FIG. 5, a claw cap 12 is provided. The claw cap 12 is a receptacle that has one open end 14. The claw cap 12 defines an interior compartment 16 that is only accessible through the open end 14. Within the interior compartment 16 of the claw cap 12, is contained a medicated compound 18. The medicated compound 18 contains a coagulant, such as styptic powder. However, the medicated compound 18 may also contain antimicrobial agents as well as numbing agents. The antimicrobial agents inhibit infection and the numbing agents help alleviate pain from any exposed nerve endings.

The claw cap 12 is sized for the animal being treated. It will therefore be understood that a claw cap 12 for a large dog would be much larger than a claw cap 12 for a kitten. Regardless of its size, the claw cap 12 is preferably made of an elastomeric material. As the claw cap 12 is advanced onto an injured claw 10, it stretches around the injured claw 10 as the injured claw 10 enters the open end 14 of the claw cap 12. The claw cap 12, therefore, engages the exterior of the injured claw 10 and remains affixed to the injured claw 10 with a friction fit. In this manner, the claw cap 12 can remain on the injured claw 10 for a prolonged period of time as the animal walks and otherwise goes about its daily activities. As long as the claw cap 12 remains in place on the injured claw 10, it protects the injured claw 10 from being reinjured. Furthermore, it prevents contamination from infecting the injured claw 10, while it prevents blood from dripping from the injured claw 10 and staining carpets, furniture or clothing.

As is shown in FIGS. 2, 3, 4 and 5, the claw cap 12 is applied to an injured claw 10 using an applicator 20. The claw cap 12 has a closed end 22 that is opposite its open end 14. A detent 24 is formed in the exterior of the claw cap 12 proximate the closed end 22. The applicator 20 contains an annular collar 26 that is sized to receive the claw cap 12. A pawl 28 is present on the interior of the collar 26 that engages the detent 24 on the claw cap 12. As a result, when a claw cap 12 is pressed into the collar 26 of the applicator 20, the pawl 28 engages the detent 24 with a snap fit. This holds the claw cap 12 within the applicator 20 regardless of the orientation of the applicator 20.

The applicator 20 has a handle tab 30 that is grasped by a user. The handle tab 30 extends behind the collar 26, wherein the claw cap 12 is inserted into the collar 26 from its front. To use the applicator 20, a claw cap 12 is inserted into the collar 26 until the detent 24 on the claw cap 12 is engaged by the pawl 28 within the collar 26. The applicator 20 is then held and manipulated by the handle tab 30. The open end 14 of the claw cap 12 is directed onto the injured claw 10. Once the claw cap 12 is fully seated on the injured claw 10, the applicator 20 is pulled away. The claw cap 12 disengages the applicator 20 and remains in place over the injured claw 10.

As has been previously mentioned, the claw cap 12 contains a medicated compound 18. The medicated compound 18 is applied to the injured claw 10 in the interior compartment 16 of the claw cap 12 once the claw cap 12 is applied to the injured claw 10. To keep the medicated compound 18 in the claw cap 12, the open end of the claw cap 12 must be sealed. This can be accomplished in a number of ways.

Referring to FIG. 4, it can be seen that the medical compound 18 itself can be loosely compressed into a plug 32. The plug 32 is then used to seal the open end 14 of the claw cap 12. When the claw cap 12 is brought into contact with the injured claw 10, the injured claw 10 first contacts the plug 32. This enables the medicated compound 18 in the plug 32 to enter the wound on the injured claw 1. As the plug 32 is contact by the injured claw 10 and is pushed into the interior compartment 16 of the claw cap 12. The contact with the injured claw 10 further crumbles the plug 32 so that it can better interact with the injured claw 10.

Figure 6:
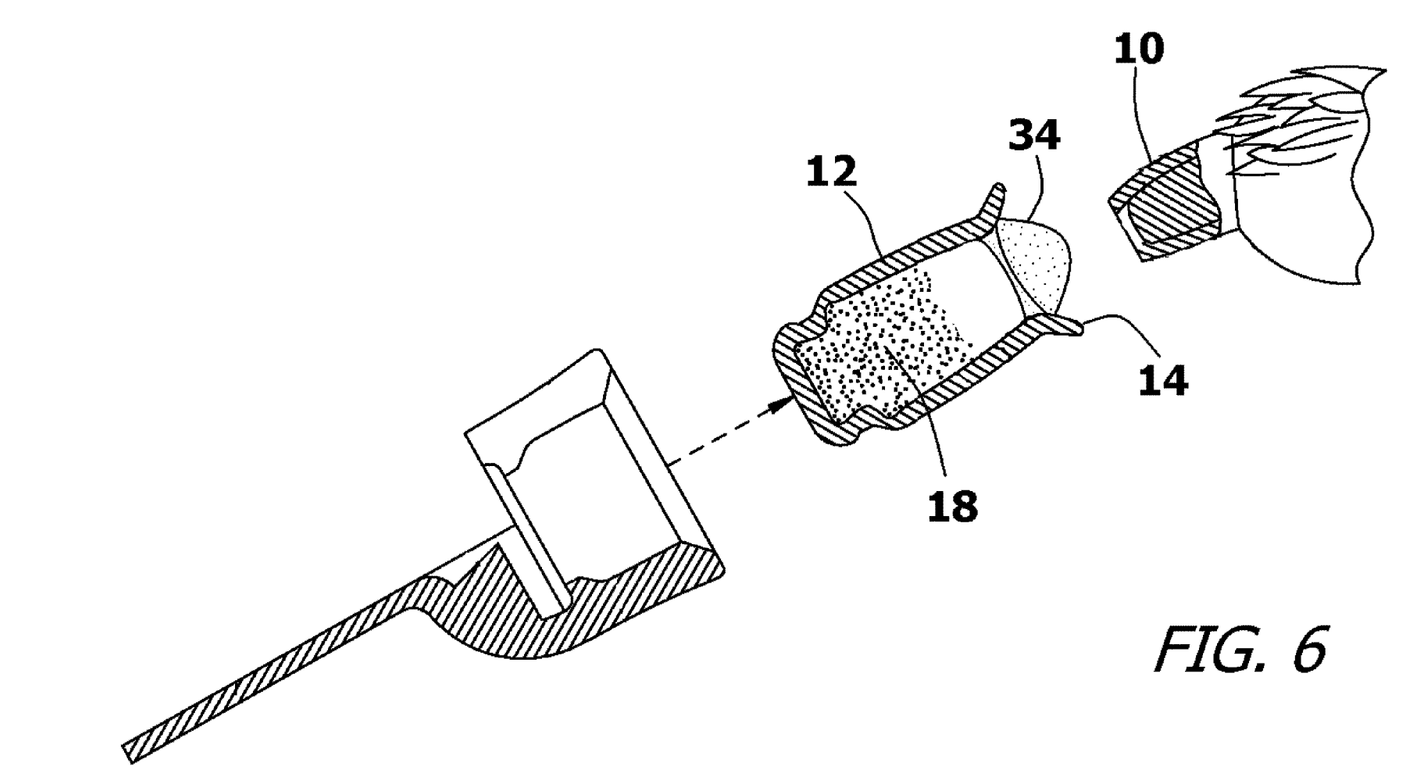
FIG. 6 is a cross-sectional view of an alternate embodiment of the present invention system.

If the medicated compound is a liquid, gel, or powder that does not readily compress into a plug, then an alternate configuration can be used to seal the medicated compound 18 into the claw cap 12. Referring to FIG. 6, a claw cap 12 is shown with a loose volume of medicated compound 18 already in the interior compartment 16 of the claw cap 12. The medicated compound 18 is held in place by a separate seal plug 34 that extends across the open end 14 of the claw cap 12. The seal plug 34 can be made from a medicated compound that is suitable for compression forming. When the claw cap 12 is pressed against an injured claw 10, the injured claw 10 first contacts the seal plug 34 and continues into the claw cap 12. Once inside the claw cap 12, the injured claw 10 is exposed to the medicated compound 18 that was present behind the seal plug 34.

Figure 7:
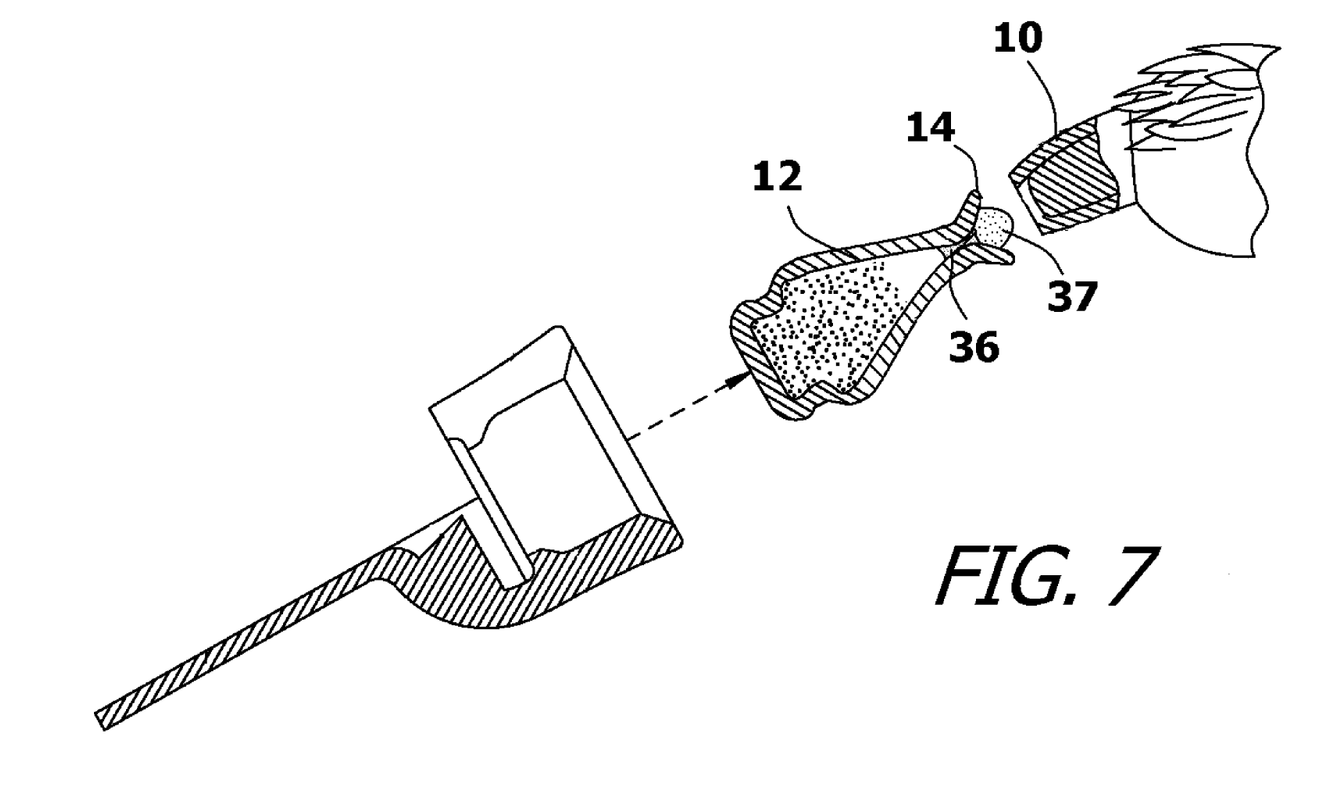
FIG. 7 is a cross-sectional view of an alternate embodiment of the present invention system.

Referring to FIG. 7, another method of sealing the claw cap 12 is shown. In this embodiment, the open end 14 of the claw cap 12 is pressed together and sealed with a small dab of a weak adhesive 36. A small plug 37 of a medicated compound is provided in front of the adhesive 36. When the claw cap 12 is pressed against an injured claw 10, the injured claw 10 first contacts the plug 37. The adhesive 36 then yields and the open end 14 of the claw cap 12 opens to receive the injured claw 10. The residual adhesive 36 on the claw cap 12 assists the claw cap 12 in adhering to the exterior of the injured claw 10.

The claw cap 12 is preferably made from an elastomeric material, such as a silicone rubber, latex, TPR or another such synthetic rubber material that can stretch over the injured claw 10. Additives can be mixed into the material of the claw cap 12 to help prevent an animal from licking or biting at the claw cap 12. Many animals instinctively lick at wounds. As such, many animals have a tendency to lick at an injured claw. The injured claw 10 is covered with the claw cap 12. If a repellant, such as hot pepper oil, tea tree oil, mineral oil or the like is mixed into the polymer of the claw cap 12, then an animal will be deterred from licking the claw cap 12. The animal will, therefore, be less likely to lick the claw cap 12 and dislodge it from the injured claw 10.

The claw cap 12 is preferably left on an injured claw 12 for a minimum of a few hours. In this time, the exposure to the medicated compound 18 in the claw cap 12 will enable the injured claw 10 to form a stable scab over the wound. The claw cap 12 can then be removed and discarded.

It will be understood that the embodiments of the present invention that are illustrated and described are merely exemplary and that a person skilled in the art can make many variations to those embodiments. For instance, the applicator can have many different ornamental shapes. Likewise, the claw caps can have many different shapes. Furthermore, the medicated compound can contain many different ingredients and may even be absent from the claw cap, wherein the claw cap is used only for protection. All such embodiments are intended to be included within the scope of the present invention as defined by the claims.

What is claimed is:

1. A method of treating and protecting an injured claw of an animal, said method comprising the steps of:

provising a claw cap, wherein said claw cap defines an interior compartment, and wherein said claw cap has an open end that provides access to said interior compartment;

providing a medicated compound within said interior compartment of said claw cap;

providing an applicator for holding said claw cap, wherein said applicator has a collar that receives said claw cap therein and a handle that is coupled to said collar for use in manually manipulating said collar and said claw cap held within said collar; and advancing an injured claw into said claw cap through said open end of said claw cap by manipulating said claw cap onto said injured claw with said applicator, wherein said injured claw is exposed to said medicated compound within said interior compartment, and wherein said claw cap engages said injured claw with a friction fit.

2. The method according to claim 1, wherein said step of providing a claw cap includes providing an elastomeric claw cap that stretches over said injured claw as said injured claw is inserted into said open end of said claw cap.

3. The method according to claim 1, wherein said step of providing a medicated compound includes providing a medicated compound that contains a coagulant.

4. The method according to claim 3, wherein said step of providing a medicated compound further includes providing a medicated compound that includes an antimicrobial.

5. The method according to claim 3, wherein said step of providing a medicated compound further includes providing a medicated compound that includes a numbing agent.

6. The method according to claim 1, further including the step of providing a seal over said open end of said claw cap, wherein said seal is broken when said injured claw is advanced into said claw cap through said open end.

7. The method according to claim 1, further including the step of providing a plug and sealing said open end of said claw cap with said plug.

8. The method according to claim 6, further including the step of positioning said medicated compound in said claw cap behind said seal.

9. A system for treating and protecting an injured claw of an animal, said system comprising:

a claw cap that defines an interior compartment, wherein said claw cap has an open end that provides access to said interior compartment, and wherein said interior compartment is sized to receive and engage said injured claw with a friction fit that attaches said claw cap to said injured claw;

a medicated compound disposed within said interior compartment; and an applicator for holding said claw cap as said claw cap is advanced onto said injured claw, wherein said claw cap engages said applicator with a snap fit.

10. The system according to claim 9, further including a seal for sealing said open end of said interior compartment.

11. The system according to claim 9, wherein said medicated compound is selected from a group consisting of coagulants, antimicrobials and numbing agents.

12. The system according to claim 9, wherein said claw cap is elastomeric and is sized to stretch over said injured claw as said injured claw is advanced into said interior compartment.

13. A method of treating and protecting an injured claw of an animal, said method comprising the steps of:

providing a claw cap, wherein said claw cap defines an interior compartment, and wherein said claw cap has an open end that provides access to said interior compartment;

providing an applicator that receives and retains said claw cap; and advancing said claw cap around an injured claw by manipulating said open end of said claw cap onto said injured claw with said applicator, wherein said claw cap engages said injured claw with a friction fit;

wherein said applicator has a collar that receives said claw cap therein and a handle that is coupled to said collar for use in manually manipulating said collar and said claw cap held within said collar.

14. The method according to claim 13, further including the step of providing a medicated compound within said interior compartment of said claw cap.

* * * * *